３,095,387
LOW-TEMPERATURE EXPANSION OF LIQUID ORGANIC POLYSULFIDE POLYMER WITH SODIUM AZODICARBOXYLATE
Martin J. Kleinfeld, Naugatuck, and Byron A. Hunter, Woodbridge, Conn., assignors to United States Rubber Company, New York, N.Y., a corporation of New Jersey
No Drawing. Filed Nov. 14, 1960, Ser. No. 68,689
7 Claims. (Cl. 260—2.5)

This invention is concerned with cellular "polysulfide rubbers" and with a process for producing the same. More particularly, the invention relates to a method involving mixing a liquid organic polysulfide rubber with an oxidative curative for such rubber along with sodium azodicarboxylate, the resulting liquid mixture being capable of simultaneously curing and expanding at ambient temperatures to form a solid, cured and expanded rubber.

The term "polysulfide rubber" is intended to embrace those synthetic rubbers that have come to be known as "Thiokol rubbers" and includes the materials described, for example, in U.S. Patent 2,466,963, Patrick et al., April 12, 1949, and at Ind. Eng. Chem. 43, 324–328 (1951). They may be described as polyalkylene polysulfides, or polythiopolymercaptans. They are also referred to as olefin polysulfide rubbers. Such organic polysulfide rubbers are available under the trade name of "Thiokol" from the Thiokol Corporation and they are usually reaction products of sodium sulfide (or polysulfides) with halogenated organic compounds such as ethylene dichloride, propylene dichloride, di-2-chloroethyl formal, 1,2,3-trichloropropane, or the like.

It is well known that these liquid organic polysulfide polymers can be cured to a solid, rubbery state by the action of oxidizing agents, whether inorganic oxidizing agents such as iodine or oxygen-containing salts, e.g., the chromates, manganates, permanganates, molybdates, etc., or oxides or peroxides, especially those of metals such as lead dioxide, tellurium dioxide, sodium peroxide, as well as per compounds such as potassium persulfate, hydrogen peroxide or the like, or whether organic oxidizing materials, including peroxides, hydroperoxides, and the like, such as benzoyl peroxide, dicumyl peroxide, cumene hydroperoxide, etc., as well as quinone dioxime, 2,4,6-trinitrobenzene, m-dinitrobenzene, etc. Oxidizing materials apparently react with sulfhydryl groups (—SH) in the polymer, removing hydrogen to form water, and leaving a free valence on the sulfur atom to serve as a site for formation of a cross-linkage with a similar site formed in the same way on another molecule of the polymer. Thus, upon addition of an oxidizing agent to the liquid organic polysulfide polymer, a curing reaction takes place, even at room temperature, leading to the formation of a solid, cured material resembling a vulcanized rubber. This curing reaction may be speeded up by application of heat, if desired. The invention is particularly adapted to those polysulfide rubbers which are liquid in the uncured state and which can be cured to a solid rubbery state in the presence of oxidizing agents such as lead dioxide, tellurium dioxide, cumene hydroperoxide, etc.

In particular the invention involves the application of a novel gas-forming agent to produce a cellular structure in the polysulfide rubber, said gas-forming agent being peculiarly adapted to the expansion of said rubber without the use of externally applied heat. Specifically, the invention resides in the discovery that cellular rubbery compositions can be produced without the application of heat by incorporating sodium azodicarboxylate.

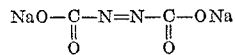

into a liquid polysulfide polymer and curing the polymer in the conventional manner in the presence of an oxidizing curing agent.

The production of cellular rubbers by the use of chemical blowing agents is well-known. Prior art procedures depend upon the decomposition of heat-sensitive organic or inorganic substances to produce gaseous products capable of forming a cellular structure within the rubbery mass. Normally, the blowing agent is incorporated into the rubber composition at temperatures well below the decomposition temperature of the blowing agent, and the rubber-blowing agent mix, together with the necessary curing agents, is then heated to curing temperature in a suitable mold or oven, whereupon the blowing agent decomposes as the rubber composition is cured. In such procedures it is essential that the rate of cure and the rate of decomposition of the blowing agent be such that the rubber composition attains sufficient strength to retain the gas within the mass. At the same time it is required that the rubber remain in an expandable state at the decomposition temperature of the blowing agent. In any case, heat is required for the curing and blowing of the rubber.

In the present invention the expansion of the liquid polysulfide rubber is accomplished without necessity for the application of heat by the use of sodium azodicarboxylate as the blowing agent. This substance is a unique chemical compound which remains in a stable, undecomposed state when dry but which decomposes in the presence of relatively small amounts of water, to produce large volumes of gaseous products capable of producing a cellular structure within the properly conditioned rubbery mass. As has been previously stated, the blowing agent of the invention is used in a liquid polysulfide polymer in conjunction with an oxidizing curing agent. It is considered that the function of such curing agents is to oxidize the free sulfhydryl (—SH) groups in the polysulfide polymer to disulfide (—S—S—) linkages, producing cross-linking and curing of the polymer. This oxidation reaction, as stated previously, is accomplished by the formation of small amounts of water which, under the conditions of the invention, effectively attacks the incorporated sodium azodicarboxylate to form gaseous products capable of producing a cellular structure in the rubbery mass. We have also observed that hydrazine is produced by the action of water on the azodicarboxylic acid salt and that this substance is converted to gas (nitrogen) in the presence of the oxidizing curative. It is pertinent that the water which initiates the decomposition of the blowing agent does not become available until the curing process starts, and sufficient tensile strength is developed within the rubbery mass to retain the gas as it is produced. At the same time, the cure occurs gradually and at such a rate as to permit expansion of the partially cured mass into a cellular structure before sufficient strength is developed to prevent the desired expansion from taking place. Ultimately a full cure is attained, and a stable cellular structure is produced. The retention of the gas may also be aided by the selection of polysulfide polymers possessing sufficient liquid viscosity in the uncured state to effectively retain the gas bubbles initially produced in the process.

The blowing agent of the invention can be incorporated in the liquid polysulfide polymer and kept under suitably anhydrous conditions until the time of application. As is the case in current commercial practice in the art of producing rubbery vulcanizates from liquid polysulfide polymers, the curing agent will be added just prior to use and thus will perform the double function of curing the polymer and decomposing the blowing agent, resulting in the formation of an expanded and cured product. In some cases it is convenient to allow the polysulfide composition containing the sodium azodicarboxylate and the curatives to stand at ambient or room temperature (e.g. about 10–35° C.) overnight or for several days. During this period expansion and cure slowly take place, and a stable cellular product is produced. A particularly valuable application of this technique will be found in foamed-in-place caulking and gasketing.

The quantity of sodium azodicarboxylate used is not critical and may vary over wide limits depending upon the degree of expansion desired. Generally, the quantity of the blowing agent used will be between 0.1% and 10% of the polysulfide rubber used. However, greater or less than the quantities indicated can be used; and it is not intended to limit the invention to the quantities of the blowing agent described. Likewise the amount of curing (oxidizing) agent may be adjusted over a considerable range to provide proper cure and to effectively decompose the blowing agent. In any case the amount of oxidizing agent employed may be the same as that conventionally used for curing the polysulfide rubber. It will be understood that the amounts of blowing agent and of oxidizing curing agent will vary with the polysulfide polymer used and with the properties desired in the expanded rubber.

The polysulfide rubber composition may also include other compounding ingredients such as carbon black, titanium dioxide, clays, or other fillers as well as other compounding ingredients normally employed in the formulation of liquid polysulfide polymers. Although heat is generally not required to effect the cure of the polymer, the composition can be subjected to moderately elevated temperatures (generally not more than about 100° C.) in cases where more rapid curing of the rubber is desired. The degree of heating, however, will be substantially less than that required for gaseous decomposition of the blowing agent in the absence of the special oxidizing curatives employed in our process. Activators such as tris (dimethylaminomethyl) phenol or diphenyl guanidine may be employed. Conversely, retarders such as stearic acid may be employed where longer curing cycles are desired.

Although sodium azodicarboxylate is to be preferred as the most economical compound, other alkali metal salts such as the potassium or lithium salt of azodicarboxylic acid may be used for the purposes of the invention.

A variety of oxidizing curatives may be used, the preferred material depending upon the type of liquid polysulfide rubber used, the time of cure desired, and upon the color requirements to be met. Typical curing agents include lead dioxide, cumene hydroperoxide, tellurium dioxide and iodine. Other curatives such as quinone dioxime, 2,4,6-trinitrobenzene, m-dinitrobenzene, etc., may be used—generally in the presence of activators such as diphenyl guanidine, sulfur, etc. In general, basic substances such as tris (dimethylamino methyl) phenol (DMP–30) activate the cure whereas acidic substances tend to retard the cure. Driers such as lead octoate and manganese or cobalt salts are useful in the curing of the polysulfide rubber. If desired, combinations of oxidizing agents may be employed to give the desired characteristics to the expanded product. Incorporation of other polymeric substances such as epoxy resins, butadiene-acrylonitrile polymers, phenolic resins, and so forth, may be desirable to impart special properties to the product. Combinations of different types of polysulfide rubbers will present advantages in certain applications.

The following examples, in which all quantities are expressed by weight, will serve to illustrate the practice of the invention in more detail.

Example 1

The sodium azodicarboxylate used in this example may be prepared as described by King, J. Am. Chem. Soc., 62, 379 (1940).

The polysulfide rubber employed in this and subsequent examples was a condensation product of 98 mole-percent bis-beta-chloroethyl formal and 2 mole-percent of 1,2,3-trichloropropane with sodium polysulfide, having an equivalent weight of 1710 by mercaptan end group analysis, and having a viscosity of 560 poises at 30° C. as measured by means of a Brookfield viscometer. Such a liquid material is commercially available under the name "Thiokol LP–2." 100 parts of the foregoing polymer was mixed with 30 parts of semi-reinforcing carbon black ("Pelletex") and 1 part of stearic acid. The resulting mixture is known as "Thiokol T–13-A" liquid polymer. To this, 0.34 part (1% of sodium azodicarboxylate was added. The materials were thoroughly mixed with a spatula. Then 4.0 parts of a paste known as Thiokol Accelerator C–5 (containing, in 100 parts, 50 parts of lead dioxide, 45 parts of dibutyl phthalate, and 5 parts of stearic acid) was stirred into the mix. The mixture was allowed to stand at room temperature overnight. The next day it was found that the liquid mass had cured to a well expanded cellular rubber possessing a fine, uniform cell structure and exhibiting good resilience properties.

The above experiment was repeated, using the same quantities of the T–13-A liquid Thiokol polymer formulation and of Accelerator C–5 but varying the quantity of sodium azodicarboxylate in the final mix. All samples were allowed to stand at room temperature overnight to complete the expansion and cure. Measurements were made of the height and density of each sample. The following data were obtained.

| Percent of Sodium Azodicarboxylate | Height of Blown Sample, inches | Density | Cell Structure |
|---|---|---|---|
| 0 (Blank) | 0.52 | 1.34 | Not Cellular. |
| 0.25 | 0.82 | 1.06 | Fine, Uniform. |
| 0.50 | 1.02 | 0.74 | Do. |
| 1.0 | 1.35 | 0.55 | Do. |
| 2.0 | 1.48 | 0.54 | Do. |
| 5.0 | 1.51 | 0.54 | Do. |

It is to be seen that the blowing agent, even when used in as little as ¼% by weight on the polymer, produces expansion of the polymer and creates a fine uniform cellular structure. The extent of expansion is evident in the increased height and in the progressively lower density of samples prepared with increasing amounts of the blowing agent.

Example 2

0.44 g. of sodium azodicarboxylate was mixed into 44 g. of Thiokol LP–2 polymer. Six grams of cumene hydroperoxide was stirred in, and then 0.6 g. of tris(dimethylaminomethyl) phenol (DMP 30) was added. The mixture was thoroughly stirred and allowed to stand. After several minutes the mixture warmed up some and increased in volume. After several hours the product had cured to a cellular rubber with fine, uniform cells. The density of the expanded product was 0.59 (compared to the same composition cured without the blowing agent of density 1.16).

Example 3

The potassium azodicarboxylate used in this example may be prepared as described by Thiele, Ann., 271, 127 (1892).

0.50 g. of potassium azodicarboxylate was mixed into 50 g. of Thiokol T–13-A liquid polymer. 6.0 g. of thiokol Accelerator C–5 was added and mixed in thoroughly. After standing overnight the mix had cured to an expanded cellular rubber exhibiting a fine, uniform cell structure. The density of the product was 0.69.

Any conventional liquid polysulfide rubber, such as any of those disclosed in the patents mentioned previously, along with any conventional oxidative curatives therefor, may be substituted in the foregoing examples with generally similar results.

Having thus described our invention, what we claim and desire to protect by Letters Patent is:

1. A method of making an expanded, cured rubber product comprising incorporating into a liquid organic polysulfide polymer which is a polyalkylene polysulfide containing sulfhydryl groups, an oxidative curative for said polymer and, as a blowing agent, an alkali metal azodicarboxylate, and subjecting the resulting mixture to a temperature within the range of from 10° C. to 100° C. whereby the said alkali metal azodicarboxylate decomposes under the influence of water released by the action of the said curative on the said polymer to produce gaseous products capable of expanding said mixture, and the composition simultaneously cures to produce an expanded, cured rubber product.

2. A method as in claim 1 in which said alkali metal azodicarboxylate is sodium azodicarboxylate.

3. A method as in claim 1 in which said alkali metal azodicarboxylate is potassium azodicarboxylate.

4. A method as in claim 1 in which the mixture is subjected to room temperature.

5. A method as in claim 1 in which the said oxidative curative is lead dioxide.

6. A method as in claim 1 in which the said liquid organic polysulfide polymer is a condensation product of 98 mole-percent of bis-beta-chloroethyl formal and 2 mol-percent of 1,2,3-trichloropropane with sodium polysulfide.

7. A method as in claim 6, in which the oxidative curative is lead dioxide and the mixture is subjected to room temperature.

References Cited in the file of this patent

UNITED STATES PATENTS

| 2,828,299 | Von Glahn et al. | Mar. 25, 1958 |
| 2,873,481 | Semegen | Feb. 17, 1959 |

FOREIGN PATENTS

| 616,315 | Great Britain | Jan. 19, 1949 |
| 719,102 | Great Britain | Nov. 24, 1954 |

OTHER REFERENCES

King: J. Am. Chem. Soc., 62, 379 (1940).

"Thiokol"—Thiokol Corporation, Trenton, N.J. Received in Patent Office June 18, 1948. Technical Service Bulletin No. 103, pages 1–4.

Plastics Progress 1955, Iliffe and Sons Ltd., London, page 53.